(12) United States Patent
Wong et al.

(10) Patent No.: US 7,958,212 B1
(45) Date of Patent: Jun. 7, 2011

(54) UPDATING PRESENCE INFORMATION

(75) Inventors: Leon Wong, Redmond, WA (US); Peter L. Beebee, Acton, MA (US)

(73) Assignee: Microsoft Corporation, Redmond, WA (US)

( * ) Notice: Subject to any disclaimer, the term of this patent is extended or adjusted under 35 U.S.C. 154(b) by 877 days.

(21) Appl. No.: 09/652,502

(22) Filed: Aug. 31, 2000

Related U.S. Application Data

(60) Provisional application No. 60/185,831, filed on Feb. 29, 2000.

(51) Int. Cl.
*G06F 15/173* (2006.01)

(52) U.S. Cl. ......... 709/223; 709/203; 709/217; 709/224

(58) Field of Classification Search .................. 709/204, 709/203, 206, 207, 217, 219, 223, 224, 227
See application file for complete search history.

(56) References Cited

U.S. PATENT DOCUMENTS

| | | | | |
|---|---|---|---|---|
| 5,315,636 A * | 5/1994 | Patel | ......................... | 379/201.07 |
| 5,596,633 A * | 1/1997 | Meier et al. | ................ | 379/201.1 |
| 5,757,901 A * | 5/1998 | Hiroshige | ................ | 379/212.01 |
| 5,764,639 A * | 6/1998 | Staples et al. | ................ | 370/401 |
| 5,825,864 A * | 10/1998 | McGraw et al. | ......... | 379/201.06 |
| 5,909,543 A * | 6/1999 | Tanaka et al. | ................ | 709/204 |
| 5,943,478 A * | 8/1999 | Aggarwal et al. | ............ | 713/201 |
| 6,141,662 A * | 10/2000 | Jeyachandran | ................ | 707/2 |
| 6,148,328 A * | 11/2000 | Cuomo et al. | ................ | 709/204 |
| 6,301,609 B1 * | 10/2001 | Aravamudan et al. | ........ | 709/207 |
| 6,349,327 B1 * | 2/2002 | Tang et al. | ................ | 709/205 |
| 6,389,127 B1 * | 5/2002 | Vardi et al. | ................ | 379/209.01 |
| 6,463,471 B1 * | 10/2002 | Dreke et al. | ................ | 709/224 |
| 6,473,098 B1 * | 10/2002 | Wakai et al. | ................ | 345/743 |
| 6,480,593 B1 * | 11/2002 | Munday et al. | ........ | 379/211.02 |
| 6,487,584 B1 * | 11/2002 | Bunney | ........................ | 709/206 |
| 6,519,639 B1 * | 2/2003 | Glasser et al. | ................ | 709/224 |
| 6,549,937 B1 * | 4/2003 | Auerbach et al. | ............. | 709/206 |
| 6,564,261 B1 * | 5/2003 | Gudjonsson et al. | ......... | 709/227 |
| 6,606,647 B2 * | 8/2003 | Shah et al. | ................ | 709/206 |
| 6,658,095 B1 * | 12/2003 | Yoakum et al. | ............. | 379/93.01 |
| 6,668,167 B2 * | 12/2003 | McDowell et al. | ............ | 455/433 |
| 6,668,173 B2 * | 12/2003 | Greene | ........................ | 455/445 |
| 6,678,719 B1 * | 1/2004 | Stimmel | ....................... | 709/204 |
| 6,697,840 B1 * | 2/2004 | Godefroid et al. | ............ | 709/205 |
| 6,760,754 B1 * | 7/2004 | Isaacs et al. | .................. | 709/206 |
| 6,839,735 B2 * | 1/2005 | Wong et al. | ................... | 709/204 |
| 7,035,923 B1 * | 4/2006 | Yoakum et al. | ............... | 709/224 |
| 7,171,473 B1 * | 1/2007 | Eftis et al. | ..................... | 709/227 |
| 7,283,805 B2 * | 10/2007 | Agrawal | .................... | 455/412.2 |
| 7,720,952 B2 * | 5/2010 | Miyata et al. | ................ | 709/223 |
| 7,725,541 B2 * | 5/2010 | Daniell et al. | ................ | 709/206 |
| 2001/0042126 A1 * | 11/2001 | Wong et al. | ................... | 709/229 |
| 2002/0019942 A1 * | 2/2002 | Wakai et al. | ................... | 713/200 |
| 2002/0198952 A1 * | 12/2002 | Bell | .............................. | 709/208 |
| 2010/0205248 A1 * | 8/2010 | Mason et al. | ................. | 709/203 |

OTHER PUBLICATIONS

Pete Runyan, All quiet on the NetWare front, Oct. 1995, Lan Magazine, p. 142.*

* cited by examiner

*Primary Examiner* — Lashonda T Jacobs
(74) *Attorney, Agent, or Firm* — Merchant & Gould P.C.

(57) ABSTRACT

Systems and methods for updating the presence information of a user associated with one or more clients. The presence information often indicates the status of a user in an instant messaging environment. A client view is associated with each separate client and the master view or status reflected to other subscribers or clients in the instant messaging environment is determined by evaluating each of the separate client views. In this manner the current status of a user may be accurately reflected to a user's subscribers.

18 Claims, 3 Drawing Sheets

UPDATING PRESENCE INFORMATION

RELATED APPLICATIONS

This application claims the benefit of U.S. Provisional application No. 60/185,831, filed Feb. 29, 2000, and is incorporated herein by reference.

BACKGROUND OF THE INVENTION

1. The Field of the Invention

The present invention relates to electronic messages and to electronic communications. More particularly, the present invention relates to methods and systems for updating the presence information of a user engaged in electronic communications.

2. The Prior State of the Art

Instant messaging, a form of electronic communication which permits users to quickly communicate over a network such as the Internet, is fast becoming a popular communication medium. The idea behind instant messaging is the desire of a group of individuals to communicate and send messages in "real time" over the Internet. In fact, the ability to communicate in "real time" is one of the essential differences between instant messaging and other forms of electronic messaging such as e-mail. Instant messaging facilitates real time electronic communications among the subscribers of an electronic messaging group and is essentially an electronic version of person to person communication.

A significant problem associated with instant messaging, however, is related to notification. For example, many individuals desire to be notified when another individual logs on, when another individual is on line, or when the status of another individual changes and what is the result of that status change. Currently, "presence information" is used to describe the status or availability of a client computer, or a user associated with that client computer. When a user changes their status, it is reflected to that user's subscribers. In other words, the subscribers are effectively notified of the change in status of that user through the presence information.

The ability of users to electronically communicate using instant messaging is often dependent on the availability of the users and presence information provides the users or members of an electronic messaging group with information that is indicative of the user's availability. For example, if a subscriber desires to conduct instant messaging with another user, the presence information of the user may be used by the subscriber in deciding whether to initiate or continue electronic communication. If the user is logged off, the subscriber may decide to not compose and send an instant message because the user is not online and will likely not receive the message in real time. Alternatively, if the user is logged in or online, the subscriber is relatively assured that an instant message will be received by the user in real time. Whether there is a response to the instant message by the user is dependent on whether the user is present at their computer and whether the user chooses to respond to the instant message. In any event, the presence information assists all of the users of a particular messaging group in making decisions relating to instant messaging.

Within a particular messaging group, each user has a particular status or state that is reflected to all of the other users or subscribers. The status of a user is often determined by the client computer or device that is associated with the user. Thus, when a user logs on, an online status is reflected to the subscribers. When the status changes, the status change is reflected to the subscribers instantly. For instance, when a user changes their status to "Out to Lunch," the subscribers are aware of this change and will adjust the way they utilize instant messaging accordingly.

Notifying the subscribers of a particular user's status becomes significantly more difficult when the user is associated or logged onto more than one client or device. Each client can believe that the user has a different status. For example, one client can believe that the user is "Online" while another client believes that the user is "Out to Lunch." Because the various clients can believe that the user has a different state or status, the clients are effectively battling each other to update the user's status that is reflected to the subscribers.

One solution to this problem is to allow each client to alter the status information when a status change occurs for that client. In other words, the status reflected to other users is the status of the last client that experienced a status change. This solution, however, can lead to an inaccurate status being reflected to the subscribers. For instance, when a user is logged in to more than one client and the status of the first client is changed to "Offline," then the subscribers perceive that the user is no longer available and not connected with the messaging group even though another client associated with the user has an "Online" status and is actually available to the subscribers. Thus, methods and systems for accurately updating presence information are desired.

SUMMARY OF THE INVENTION

The present invention provides systems and methods for updating presence information. Within an environment supporting instant messaging, presence information is often used by subscribers or watchers of a user to determine the current status of the user. Because the presence information of a particular user is usually controlled by that user, the subscribers can be instantly informed of a user's status via the presence information. The subscribers, as well as the user, can use the presence information, for example, to make decisions relating to instant messaging.

Examples of presence information, which indicate the status of a user, include online, offline, on the phone, and the like. If a user is online, then the user is usually available to actively participate in instant messaging. Similarly, if a user is offline, then the user is most likely unavailable to actively participate in instant messaging. Thus, the decision made by members of an electronic messaging group to electronically communicate using instant messages is frequently influenced by the presence information of the group members.

Properly maintaining presence information becomes more difficult when a user is associated with multiple clients. In order to effectively update presence information in a system where a user is associated with more than one client, a client view status is created and maintained for each separate client. Each client view status reflects the status of the associated client. The association between each client view status and the client is typically accomplished using a view identifier which essentially maps the appropriate view status to the corresponding client.

When the status of one of the clients changes, then the associated client view status is changed to reflect the status change. However, the master view, which is the status of the user reflected to the user's subscribers, is dependent on both the status change and the status of the other clients associated with the user. By evaluating the individual client view statuses and the proposed status change, the correct status of the user may be presented to both the subscribers and the other clients associated with the user via the master view status.

For example, if a user has two clients, both of which have a view status of online, and one of the clients sends a status update of offline, the master view status is not changed because the correct status of the user is online. Thus the status change causes the associated client view to show that the client is offline, while the master view reflects to the subscribers that the user is still online.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The ability to properly update and reflect presence information is important to an instant messaging environment because the messages are transmitted substantially instantaneously. Instant messaging permits users to have a real time electronic conversation. If the presence information, however, does not reflect the true status of one of the instant messaging group participants, then the ability of the participants to communicate in real time is effectively reduced.

The present invention provides both systems and methods for updating presence information such that the subscribers of an instant messaging group are aware of the correct status of all the other group members. This is particularly important in situations where a single user is associated with multiple clients within the same instant messaging group. The correct status of the user, in this situation, is reflected to the subscribers by establishing a master view that accounts for the specific statuses of the individual clients associated with a user. Thus, the master view reflects the status of the user to the subscribers while client views are utilized to determine both the status of the separate user clients associated with the user as well as the status that is reflected by the master view.

The present invention extends both methods and systems for updating and reflecting presence information to subscribers within an instant messaging group. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
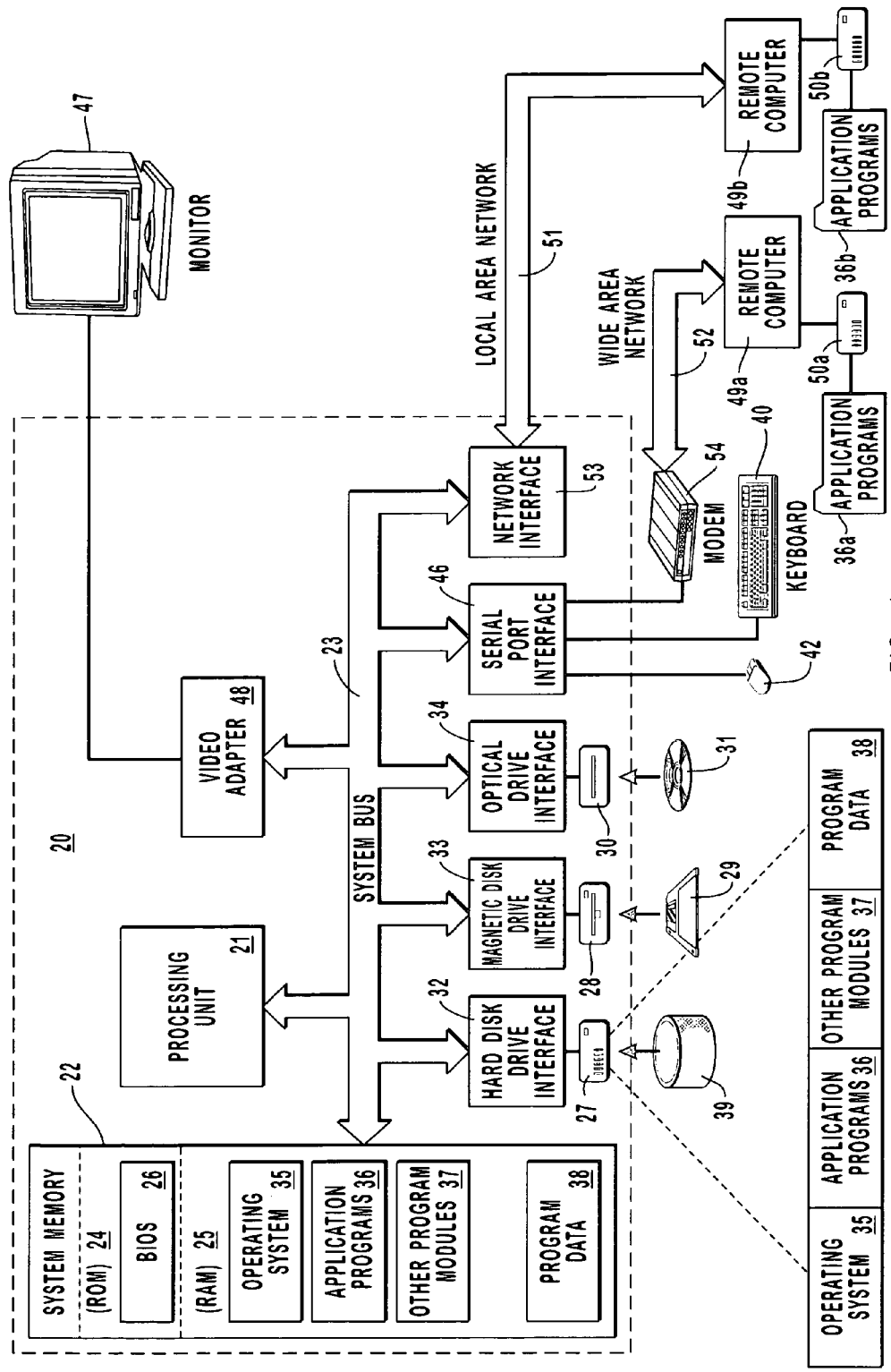
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

As used herein "client" refers to a client computer that is connected to a server computer. Client may also refer, however, to a user or individual that operates the client. Conversely, user does not typically refer to the client computer, but is used to refer to the individual operating the computer. The present invention is described in terms of client and server computers, but it is understood that in some instances, a client computer may also be a server computer and a server computer may also be a client computer. The particular designation of a computer may frequently be derived from the context of the computer network. As used herein, "subscriber" may refer to either a client computer or to a user. Within an instant messaging group, a user or client typically has one or more subscribers. Thus, with respect to a particular user, other clients are subscribers and the particular user is a subscriber of the other clients or users. As used herein a "messaging group" typically refers to a group of users that are able to communicate utilizing instant messaging or other form of electronic communication.

While the present invention is described in terms of instant messaging, the methods and systems of the present invention are not limited to instant messaging but may be applied to other forms of electronic communication.

Figure 2:
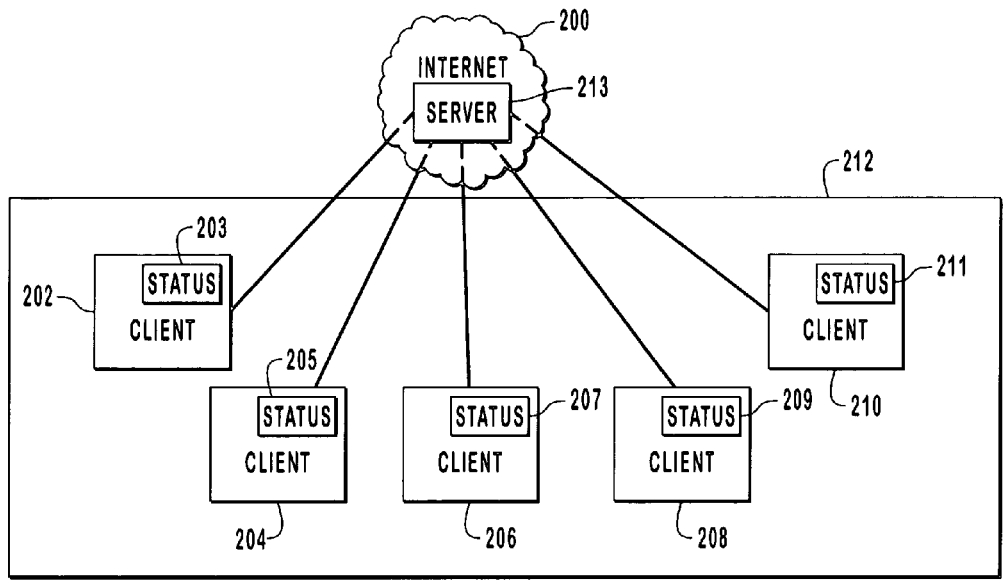
FIG. 2 is illustrates an exemplary messaging group having a plurality of connected clients.

FIG. 2 illustrates an exemplary system in which the systems and methods of the present invention may be implemented. FIG. 2 illustrates clients 202, 204, 206, 208, and 210, which are connected to the Internet 200 or other computer network that supports instant messaging, and the clients form a messaging group 212. With regard to client 202, the clients 204, 206, 208 and 210 are subscribers of client 202 and client 202 is a subscriber to clients 204, 206, 208, and 210 in this example.

Each client in the messaging group 212 is capable of sending an instant message to one or more of the other clients in the messaging group 212. When the electronic message is sent by one of the clients, the subscribers of that client receive the instant message very quickly. The ability of the clients to communicate as a messaging group 212 also involves the use of a server 213. Although only one server 213 is illustrated, it is understood that multiple servers may be involved in the electronic communication that occurs within the messaging group 212.

The status or presence information of a client is useful in identifying the current state of a particular client or user. Because electronic messages can be sent within a messaging group 212 very quickly, it is useful to know the status of each client to which a user is subscribed. Exemplary states or statuses include, but are not limited to, online, offline, away, invisible, busy, back-soon, on-phone, at-lunch, and the like. The status of a particular client can be discovered by other clients or subscribers or the status is simply readily available to other clients within the messaging group.

While the status is representative of the state of each respective client and is illustrated as being located at the clients in FIG. 2, the status is usually maintained by the server 213 such that the status of one particular client is more accessible to the other clients in the messaging group 212. In other words, the server 213 is usually responsible for maintaining the status of a particular client that is displayed to that client's subscribers. More specifically, the status 203 of client 202 is preferably maintained by the server 213 and reflected to the subscribers of client 202 by the server 213.

Each client illustrated in FIG. 2 is able to change their respective status. Client 202 may decide to go to lunch and would change the status 203 to at-lunch. In accordance with this status change, the server 213 would reflect to the subscribers that the client 202 is at-lunch. Providing presence information in this manner enhances the effectiveness of the electronic communication within the messaging group 212. Client 204, for instance, will not generate an electronic message intended for client 202 if the status 203 of client 202 is offline or at-lunch or other similar state because client 204 knows that client 203 will not receive the electronic message immediately.

Figure 3:
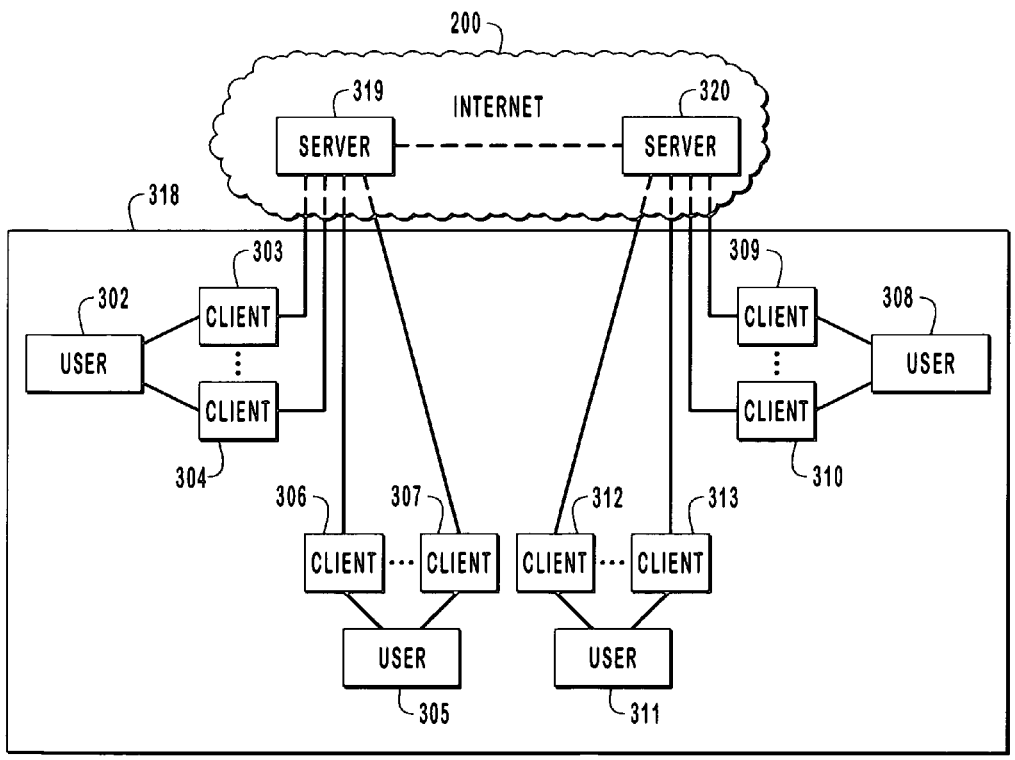
FIG. 3 illustrates an exemplary messaging group where each user is associated with one or more clients.

FIG. 3 is a more detailed block diagram of a messaging group 318 that is connected over the Internet 200. As illustrated, the messaging group 318 comprises users 302, 305, 308, and 311. It is understood that the messaging group 318 may comprise other users which are not illustrated. FIG. 3 also depicts each user being associated to one or more clients. User 302 has access to clients 303 and 304, user 305 has access to clients 306 and 307, user 308 has access to clients 309 and 310, and user 311 has access to clients 312 and 313. The messaging group 318 is connected through servers 319 and 320. The presence information of the users, as previously described, is maintained by the server computers 319 and 320.

The messaging group 318 operates in a similar manner to the messaging group 212 shown in FIG. 2. However, it is more difficult to maintain status or presence information in the messaging group 318 because each user is capable of utilizing multiple clients within the messaging group. Because a single user is associated with multiple statuses and multiple clients, it is possible that the status reflected to a client's subscribers is incorrect as previously described.

Figure 4:
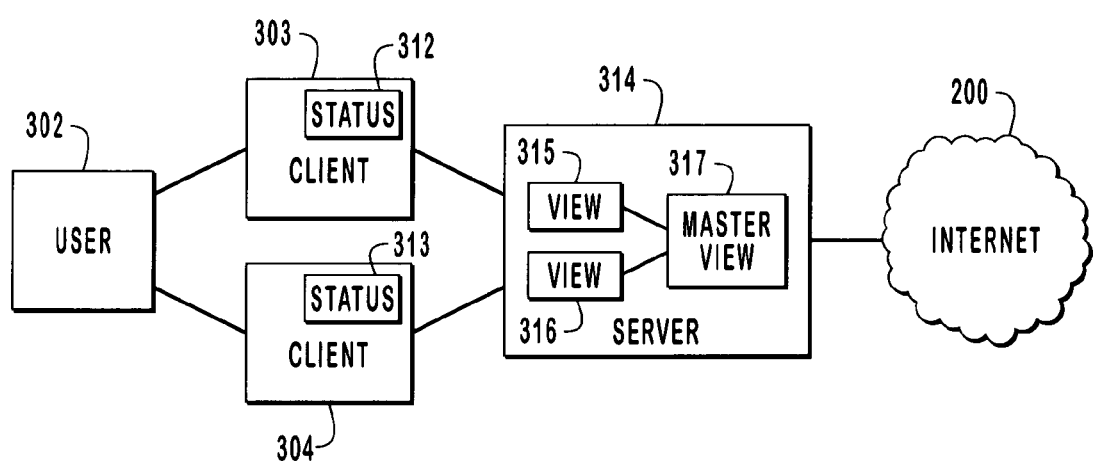
FIG. 4 illustrates the status of the separate clients as well as the status reflected to other clients within a messaging group.

FIG. 4 is a block diagram more fully illustrating the systems and methods that permit a user's status to be correctly reflected to the user's subscribers. Accurately reflecting a user's status to the subscribers enables the messaging group 318 to communicate quickly and efficiently. If an inaccurate status is reflected, then the messaging group 318 will not be able to function as efficiently. Reflecting the current or correct user status is particularly important when a single user is present at more than one client. For example, a user may change the status of one client to "Offline" even though the user has an "Online" status at another client. If the "Offline" status is reflected to the subscribers, then the subscribers are not aware that the accurate status of the user is "Online."

In FIG. 4, user 302 is shown as being associated with clients 303 and 304. Client 303 has a status 312 and client 304 has a status 313. Generally, the status displayed to other clients and users within the messaging group is the status of the last client to experience a status change. As previously indicated, this can also cause an incorrect status to be displayed to other clients and users. In this embodiment, a master view 317 is generated, which corresponds to the status displayed or reflected to a user's subscribers in the messaging group The status reflected by the master view 317 does not necessarily correspond with the status of the last client to experience a status change.

Each client in this embodiment has a client view that is associated with each client: view 315 is associated with client 303 and view 316 is associated with client 304. Views 315 and 316 reflect the current or default status of clients 303 and 304 respectively. Thus, if client 303 goes offline, then view 315 reflects that client 303 is offline. The master view 317, however, may not reflect the status change of client 303. The server 314 will review each of the client views such that the master view 317 accurately reflects the current state of the user 302, as opposed to reflecting the current state of one of the clients associated with the user 302.

When a client sends an initial status to a server, the server responds by providing a view identifier for that specific client. When other clients associated with the same user send an initial status to the server, separate and distinct view identifiers are provided to those clients. Thus the view identifiers are used to identify which client view reflects the status of which client. When a client that has already received a view identifier attempts to update their view with a new status, the corresponding view identifier is sent along with the status change in order to ensure that the correct client view status is updated at the server.

The following scenario, while demonstrating this process using the clients illustrated in FIG. 4, does not include the steps necessary to update the master view:

1) Client 303 sends an initial status 312 to the server 314 without a view identifier;
2) Server 314 responds to client 303 by providing a view identifier of 1 and the view identifier of 1 is associated with the view 315;
3) Client 303 sends an updated status 312 to the server 314 along with the view identifier of 1 and the server 314 updates the view 315;
4) Client 304 sends an initial status 313 to the server 314 without a view identifier;
5) Server 314 responds to client 304 by providing a view identifier of 2 that is associated with a view 316;
6) Client 1 sends an updated status 312 to the server 314 along with the view identifier of 1 and the server 314 updates the view 315; and
7) Client 2 sends an updated status to the server 314 with the view identifier of 2 and the server 314 updates the view 316.

In this manner, the individual views of the separate clients can be established and maintained by the server 314.

When the server 314 receives a status update from a client 303, the server 314 determines if client 303 is the only active client of the user. If client 303 is the only active client for the user 302, then the master view 317 is altered to match the status of the client 303 and the status 312 of the client 303 is reflected to the other clients or subscribers that have subscribed to the user 302. In other words, the master view 317, as modified by the status change, is reflected or made available to the other clients in the messaging group.

The following example illustrates how the master view 317 will change according to status changes indicated by one or more of the clients associated with the user 302. The following example is a continuation of the previous example and assumes that the clients 303 and 304 already have a view identifier. While not written, this example also assumes that the appropriate view identifier for each status change is also sent to the server 314.

1) Client 303 sends a status update of On the Phone to the server 314.
2) The view 315 reflects that the status 312 of the client 303 is On the Phone.
3) The master view 317 is changed to reflect that the status of the user 302 is On the Phone.
4) The server 314 sends the updated master view status of On the Phone to both the client 304 and to the user's subscribers.
5) The client 303 sends a status update of Online to the server 314 and the view 315 reflects that the status 312 of the client 303 is Online.
6) The master view 317 is changed to reflect that the status of the user 302 is Online.

7) The server 314 reflects the updated master view status of Online to both the client 304 and to the user's subscribers.
8) The client 304 sends a status update of Out to Lunch and the view 316 is changed to reflect that the status 313 of the client 304 is Out to Lunch.
9) The master view 317 is changed to reflect that the status of the user 302 is Out to Lunch.
10) The server 314 reflects the updated master view status of Out to Lunch to both the client 303 and to the user's subscribers.
11) The client 304 sends a status update of Idle to the server 314 and the view 316 is updated to reflect that the status 313 of the client 304 is Idle.
12) The server 314 ignores the Idle update sent by the client 304 in this case and the master view 317 is not changed.
13) The client 303 sends a status update of Offline to the server 314 and the view 315 is updated to reflect that the status 312 of the client 303 is Offline.
14) The server 314 ignores the update sent by the client 303 in this case.
15) The server 314 updates the master view 317 to reflect, to the client 303 and to the user's subscribers, that the status of the user 302 is Idle as determined by the view 316 because client 304 is the only client currently logged in and Idle is therefore the correct status as determined by evaluating views 315 and 316.

When a status change is received at the server 314, the views 315 and 316 are often evaluated or compared to determine what the master view 317 should reflect to the subscribers. In one embodiment, there are several status changes that are treated differently than other status changes. Usually, the master view 317 is changed to match the most recent status change except in some circumstances. If the status change received by a client is "Invisible," then the master view 317 is changed to "Offline" regardless of the other client views. If the status change is "Idle," then the status change is simply ignored and the current master view status is maintained unless all of the other client views show a status of either "Idle" or "Offline," in which case the master view 317 is changed to "Idle." If the status change is "Offline," then the status change is simply ignored and the current master view status is maintained unless all of the other client views show a status of "Offline," in which case the master view 317 is changed to "Offline." More generally, the status change received from a client is evaluated by considering both the status change and the statuses indicated by the current client views. The status reflected by the master view 317 is determined by this evaluation.

When a status change or update of "Idle" or "Offline," care is taken to ensure that the correct status of the user is reflected to the subscribers. Simply updating the master view to reflect the Idle or Offline status update does not reflect the accurate status of the user because another client may have an "Online" status. In this case, reflecting the "Idle" or "Offline" status to the subscribers will have an effect on the electronic communication that may occur between the user and the subscribers. For this reason, it is important to account for the current status of each client associated with the user before reflecting a status to the user's subscribers.

More generally, the status reflected to a user's subscribers can be determined using a priority system. In the examples described herein, the "Offline" status has the lowest priority, the "Idle" status has the next priority, and the remaining statuses have the highest priority. Using a priority scheme enables the master view status to reflect or advertise the client view status with the highest priority. The priority system described herein is not intended to be limiting, but is an example of how a priority system may be implemented with regard to the status of a user that is reflected to the user's subscribers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A computer-implemented method for updating presence information for a user on a network, wherein the user accesses the network via a first client device and a second client device, the method comprising:

prioritizing a plurality of client status identifiers, wherein the prioritized plurality of client status identifiers is ordered from a lowest priority level to a highest priority level;

receiving a first client status identifier from the first client device, wherein the first client status identifier is one of the plurality of client status identifiers;

receiving a second client status identifier from the second client device, wherein the second client status identifier is one of the plurality of client status identifiers;

populating a first client view with the first client status identifier and a second client view with the second client status identifier;

determining accurate presence information for the user, wherein determining the accurate presence information for the user comprises:

determining that the first client status identifier indicates the accurate presence information for the user when the first client status identifier has a higher priority level than the second client status identifier based on a comparison of the first client status identifier to the second client status identifier;

determining that the second client status identifier indicates the accurate presence information for the user when the second client status identifier has a higher priority level than the first client status identifier based on a comparison of the first client status identifier to the second client status identifier; and determining that both the first client status identifier and the second client status identifier indicate the accurate presence information for the user when the first client status identifier and the second client status identifier have a same priority level based on a comparison of the first client status identifier to the second client status identifier;

populating a master view with the accurate presence information for the user, wherein the master view reflects the accurate presence information to a plurality of subscribers of the user within a messaging group;

subsequent to receiving the first client status identifier and the second client status identifier, receiving a third client status identifier from the first client device, wherein the third client status identifier is one of the plurality of client status identifiers and is different from the first client status identifier and the second client status identifier;

populating the first client view with the third client status identifier;

determining that the third client status identifier indicates inaccurate presence information for the user by determining that the third client status identifier has a lower priority level than the second client status identifier based upon a comparison of the third client status identifier to the second client status identifier; and maintaining the accurate presence information within the master view.

2. The computer-implemented method of claim 1, the method further comprising:

subsequent to receiving the first client status identifier and the third client status identifier, receiving an updated client status identifier from the first client device, wherein the updated client status identifier is one of the plurality of client status identifiers;

populating the first client view with the updated client status identifier;

determining the updated client status identifier indicates the accurate presence information for the user that when the updated client status identifier has a higher priority level than the second client status identifier based upon a comparison of the updated client status identifier to the second client status identifier; and further populating the master view with the accurate presence information for the user, wherein the master view reflects the accurate presence information to the plurality of subscribers of the user within a messaging group.

3. The computer-implemented method of claim 1, the method further comprising:

subsequent to receiving the first client status identifier and the third client status identifier, receiving an updated client status identifier from the first client device, wherein the updated client status identifier is one of the plurality of client status identifiers;

populating the first client view with the updated client status identifier;

determining the undated client status identifier indicates inaccurate presence information for the user when the second client status identifier has a higher priority level than the updated client status identifier based on the prioritized plurality of client status identifiers; and maintaining the accurate presence information within the master view.

4. The computer-implemented method as defined in claim 1, wherein the plurality of client status identifiers includes one or more of: online, offline, away, invisible, busy, back soon, on phone, and at lunch.

5. The computer-implemented method as defined in claim 1, wherein the first client view represents presence information of the first client device and the second client view represents presence information of the second client device, wherein the first client view and the second client view are associated with the user.

6. The computer-implemented method as defined in claim 1, wherein populating the master view with the accurate presence information for the user further comprises publishing the accurate presence information within the master view to the plurality of subscribers.

7. The computer-implemented method as defined in claim 1, wherein the first client status identifier is an "online" client status identifier, the second client status identifier is an "online" client status identifier, the third client status identifier is either an "idle" or "offline" client status identifier, and the master view indicates the accurate presence information as "online" for the user.

8. A computer-implemented method for updating presence information for a user on a network, wherein the user accesses the network via a first client device and a second client device, the method comprising:

prioritizing a plurality of client status identifiers, wherein the prioritized plurality of client status identifiers is ordered from a lowest priority level to a highest priority level;

receiving a first client status identifier from the first client device, wherein the first client status identifier is one of the plurality of client status identifiers;

receiving a second client status identifier from the second client device, wherein the second client status identifier is one of the plurality of client status identifiers;

populating a first client view with the first client status identifier and a second client view with the second client status identifier;

determining accurate presence information for the user comprising determining whether the first client status identifier or the second client status identifier has a higher priority level based on a comparison of the prioritized plurality of client status identifiers, wherein a client status identifier having a higher priority level indicates the accurate presence information for the user;

populating a master view with the accurate presence information, wherein the master view reflects the accurate presence information to a plurality of subscribers of the user within a messaging group;

subsequent to receiving the first client status identifier and the second client status identifier, receiving a third client status identifier from the first client device, wherein the third client status identifier is one of the plurality of client status identifiers and is different from the first client status identifier and the second client status identifier;

populating the first client view with the third client status identifier;

determining inaccurate presence information for the user by determining that the third client status identifier has a lower priority level than the second client status identifier based on the prioritized plurality of client status identifiers; and maintaining the accurate presence information within the master view.

9. The computer-implemented method as defined in claim 8, wherein the prioritized plurality of client status identifiers include one or more user-defined client status identifiers.

10. The computer-implemented method as defined in claim 8, wherein the first client view represents presence information of the first client device and the second client view represents presence information of the second client device, wherein the first client view and the second client view are associated with the user.

11. The computer-implemented method as defined in claim 8, wherein reflecting the master view to a plurality of subscribers of the user within a messaging group further comprises the accurate presence information populated within the master view to the plurality of subscribers.

12. A computer system for updating presence information for a user on a network, wherein the user accesses the network via a first client device and a second client device, comprising:

at least one processor; and at least one memory, communicatively coupled to the at least one processor and containing instructions that, when executed by the at least one processor, perform a method, comprising:

prioritizing a plurality of client status identifiers, wherein the prioritized plurality of client status identifiers is ordered from a lowest priority level to a highest priority level;

receiving a first client status identifier from the first client device, wherein the first client status identifier is one of the plurality of client status identifiers;

receiving a second client status identifier from the second client device, wherein the second client status identifier is one of the plurality of client status identifiers;

populating a first client view with the first client status identifier and a second client view with the second client status identifier;

determining accurate presence information for the user comprising determining whether the first client status identifier or the second client status identifier has a higher priority level based on a comparison of the prioritized plurality of client status identifiers, wherein a client status identifier having a higher priority level indicates the accurate presence information for the user;

populating a master view with the accurate presence information for the user, wherein the master view reflects the accurate presence information to a plurality of subscribers of the user within a messaging group;

subsequent to receiving the first client status identifier and the second client status identifier, receiving a third client status identifier from the first client device, wherein the third client status identifier is one of the plurality of client status identifiers and is different from the first client status identifier and the second client status identifier;

populating the first client view with the third client status identifier;

determining that the third client status identifier indicates inaccurate presence information for the user by determining that the third client status identifier has a lower priority level than the second client status identifier based on the prioritized plurality of client status identifiers; and maintaining the accurate presence information within the master view.

13. The computer system of claim 12, wherein the method executed by the at least one processor further comprises:

subsequent to receiving the first client status identifier and the third client status identifier, receiving an updated client status identifier from the first client device, wherein the updated client status identifier is one of the plurality of client status identifiers;

populating the first client view with the updated client status identifier;

determining the updated client status identifier indicates the accurate presence information for the user when the updated client status identifier has a higher priority level than the second client status identifier based upon a comparison of the updated client status identifier to the second client status identifier;

further populating the master view with the accurate presence information for the user, wherein the master view reflects the accurate presence information to the plurality of subscribers of the user within a messaging group.

14. The computer system of claim 12, wherein the method executed by the at least one processor further comprises:

subsequent to receiving the first client status identifier and the third client status identifier, receiving an updated client status identifier from the first client device, wherein the updated client status identifier is one of the plurality of client status identifiers;

populating the first client view with the updated client status identifier;

determining the updated client status identifier indicates inaccurate presence information for the user when the second client status identifier has a higher priority level than the updated client status identifier based on the prioritized plurality of client status identifiers; and maintaining the accurate presence information within the master view.

15. The computer system of claim 12, wherein the plurality of client status identifiers include one or more of: online, offline, away, invisible, busy, back soon, on phone, and at lunch.

16. The computer system of claim 12, wherein the first client view represents presence information of the first client device and the second client view represents presence information of the second client device, wherein the first client view and the second client view are associated with the user.

17. The computer system of claim 12, wherein populating the master view with the accurate presence information for the user further comprises publishing the accurate presence information within the master view to the plurality of subscribers.

18. The computer system of claim 12, wherein the first client status identifier is an "online" client status identifier, the second client status identifier is an "online" client status identifier, the third client status identifier is either an "idle" or "offline" client status identifier, and the master view indicates the accurate presence information as "online" for the user.

* * * * *

UNITED STATES PATENT AND TRADEMARK OFFICE
CERTIFICATE OF CORRECTION

PATENT NO. : 7,958,212 B1  
APPLICATION NO. : 09/652502  
DATED : June 7, 2011  
INVENTOR(S) : Wong et al.

Page 1 of 1

It is certified that error appears in the above-identified patent and that said Letters Patent is hereby corrected as shown below:

In column 11, line 21, in Claim 2, after "user" delete "that".

In column 11, line 39, in Claim 3, delete "undated" and insert -- updated --, therefor.

Signed and Sealed this
Thirteenth Day of September, 2011

David J. Kappos
*Director of the United States Patent and Trademark Office*